United States Patent [19]

Richards

[11] Patent Number: 4,491,925

[45] Date of Patent: Jan. 1, 1985

[54] PRECISION TIME TRACKING LINE GENERATOR

[75] Inventor: Gerald P. Richards, Framingham, Mass.

[73] Assignee: Raytheon Company, Lexington, Mass.

[21] Appl. No.: 275,489

[22] Filed: Jun. 19, 1981

[51] Int. Cl.[3] ........................................ G06F 3/14

[52] U.S. Cl. ........................................ 364/521; 340/720; 315/370; 315/387

[58] Field of Search ................ 364/521, 719; 340/720, 340/724, 739, 812, 813; 315/370, 387, 389

[56] References Cited

U.S. PATENT DOCUMENTS 3,487,164 12/1969 Eggert ................................ 315/370
3,757,038 9/1973 Jannery et al. ................. 340/720 X
3,800,183 3/1974 Halio et al. ...................... 340/739 X
3,825,796 7/1974 Bello .............................. 315/370 X
3,952,297 4/1976 Stauffer et al. ................. 340/324 A
4,115,863 9/1978 Brown ................................ 364/521
4,228,510 10/1980 Johnson et al. ..................... 364/521
4,287,506 9/1981 Richards ......................... 315/370 X

*Primary Examiner*—Jerry Smith
*Assistant Examiner*—Gary V. Harkcom
*Attorney, Agent, or Firm*—Walter F. Dawson; Richard M. Sharkansky; Joseph D. Pannone

[57] ABSTRACT

A display system line generator network having an error correction feedback loop which achieves high positional accuracy for both plan position indicators PPI and synthetic character and line data. Digital reference position and relative beam motion data are fed into separate D/A converters. The staircase effect at the output of the D/A that processes the relative beam motion data is eliminated in a constant current integrator. The output of the integrator is combined with the reference position signal in a summing amplifier and the summed signal is fed to a deflection amplifier. A feedback circuit picks off the inputs to the summing amplifier and uses their comparison to synchronize time with beam position by compensating for errors due to component drift and aging.

44 Claims, 6 Drawing Figures

PRECISION TIME TRACKING LINE GENERATOR

BACKGROUND OF THE INVENTION

This invention relates to display systems and more particularly to the generation of characters or lines on a display device with high accuracy without the use of expensive precision electronic components.

In the prior art, the generating of lines on a cursive display is accomplished by defining successive points along a line with a precision digital-to-analog (D/A) converter followed by a delay line integrator in each axis. A precision 13-bit D/A converter operating at high conversion rates of approximately 3 MHz translates the successive point definitions into successive level definitions containing transitional "glitches". A special de-glitching circuit removes virtually all these glitches and provides its output to a tapped delay line integrator. The integrator breaks each major step into a series of smaller steps thereby raising the roughness frequency components to approximate 30 MHz. A low frequency filter is used to remove the high frequency roughness and produces the desired smooth voltage waveform. However, the high quality D/A's and deglitcher used in this approach are relatively expensive components.

Another approach in the prior art uses less precise D/A's whereby one D/A is used to define a starting position anywhere on a display screen and another D/A is used to feed an analog integrator to produce the desired line relative to that starting position. These two waveforms are summed together to form the final output to X or Y deflection amplifiers. Again in such an open loop-system, expensive precision components are generally employed to minimize line drift due to component aging or temperature effects. Even then, the interaction between positions defined by a reference position D/A and positions defined by a D/A integrator results in a high frequency of maintenance adjustment and a performance compromise of display position-line registration.

SUMMARY OF THE INVENTION

The invention discloses an apparatus and method for a display system line generator comprising an error correction feedback loop for achieving high positional accuracy. The generator comprises means for generating a reference position for a character or a line on a display, means for generating character slope or a line slope on the display for defining said character or said line and means coupled to said slope generating means for testing and correcting a moving beam on said display over a period of time with reference to a specific initial position and a specific final position. The outputs of the reference position generating means and the slope generating means couple to a sum amplifier for producing the moving beam on the display. The slope generating means comprises an integrating means which further comprises an electrically variable parameter means for compensating for component variance due to aging and parameter drift. In the preferred embodiment, the electrically variable parameter means comprises a variable resistance means. The beam position testing and correcting means comprises a feedback means from the outputs of the reference position generating means and the slope generating means to the electrically variable parameter means. The feedback means provides for adjustment of the electrically variable parameter means in the character or line slope generating means. In addition, a gain switch means is provided for adjusting the size of a line or a character.

The invention further discloses means for generating a reference position for a character or a line on a display, means for generating a character slope or a line slope on a display for forming a character or a line, gain means for adjusting the size of a line or a character, comparator means for performing periodic positional tests on axial deflection waveform component signals for the display over a defined interval of time, detector means for determining an amount of time error resulting from the comparator means, and feedback means for adjusting the slope generating means based on the amount of error determined by the detector means. The detector means comprises a loadable counter means for determining the fixed period of time for the positional tests.

The invention further discloses the method of generating a precision time tracking line in a display system comprising the steps of generating a reference position for a character or a line on a display, generating a character slope or a line slope on the display for forming a character or a line, summing the reference position and the character or line slope in an amplifier for producing a moving beam on said display for forming said character or said line, performing periodic positional tests on axial deflection waveform component signals for said display over a defined interval of time, determining an amount of time error from the positional tests, and adjusting the character slope or the line slope with feedback means based on the amount of the time error. The step of generating a character slope or a line slope comprises integrating a constant current from an electrically variable parameter means which is controlled by the feedback means. The step of performing periodic positional tests comprises moving a beam on said display over a defined interval of time with reference to a specific initial position and a specific final position.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
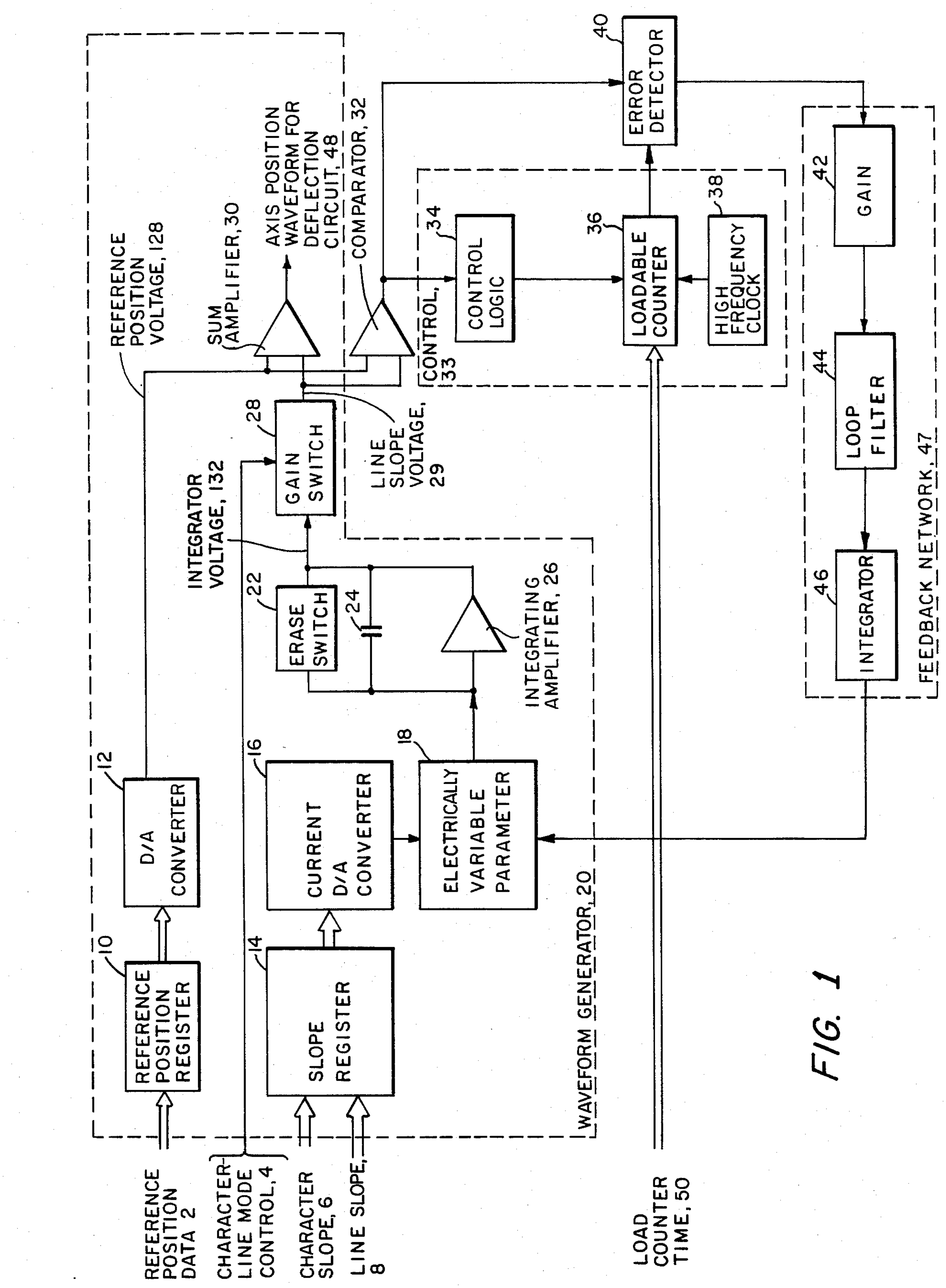
FIG. 1 is a functional block diagram of the invention.

Referring now to FIG. 1, there is shown a precision time tracking line generator according to the present invention. The line to be generated may be a line connecting two points or it may be a line forming a character. The reference position data 2 input provides a digital word of typically 11 bits to the reference position register 10, the output of which is converted to a reference position voltage signal 128 by a digital-to-analog (D/A) converter 12. The reference position voltage 128 determines the starting position in one axis on a cathode ray tube (CRT) display for a moving beam to form the line or character to be displayed.

The slope register 14 receives a character slope 6 data word or a line slope 8 data word from a display processor (not shown, but known to one of ordinary skill in the art) each data word being typically 12 bits for specifying the slope of a line element of a character or the slope of a line. The output of the slope register 14 is connected to a D/A converter which provides the selected slope current to an electrically variable parameter means. In the present invention, the electrically variable parameter 18 means comprises a variable resistance which is responsive to feedback network 47. An integrating amplifier 26 receives a constant current via the electrically variable parameter 18 for generating the slope of a desired line or character. The continuous integration of a constant current defining said desired slope results in the generation of lines with no staircase effect. An erase switch 22 connected across the integrating amplifier 26 provides for returning the integrator output to a neutral state so that it does not alter the overall summed voltage output defining a reference position until the integration begins. The output of the integrating amplifier 26 connects to a gain switch 28 which is controlled by the character-line mode control 4 signal from said display processor and adjusts the size of the line or character being displayed. The sum amplifier 30 receives the reference position voltage 128 and the line slope voltage 29 signals and generates the axis position waveform for deflection circuit signal 48.

The reference position voltage 128 and the line slope voltage 29 signals also are provided to a comparator 32, which together with control 33, an error detector 40 and a feedback network 47 form the test capability of the invention for maintaining the accuracy of the slope generating circuits. The test operation occurs once to a few times per display refresh interval.

Figure 2:
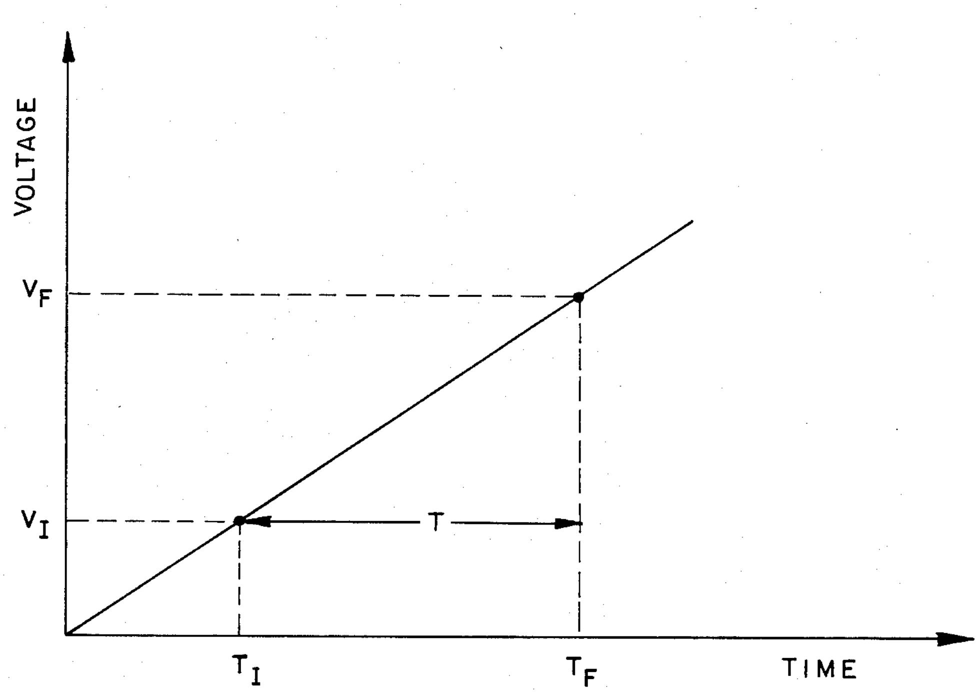
FIG. 2 shows a graph of a test slope during a positional test over a defined interval of time.

Referring to FIG. 1 and FIG. 2, each test operation of the invention comprises the following procedural method:

(1) An initial reference position digital word is loaded into the reference position register 10 by a display processor.

(2) A specific test slope digital word is loaded into the slope register 14.

(3) A specific count is loaded into the loadable counter 36 by the load counter time 50 input from a display processor.

(4) A D/A converter converts the initial reference position digital word to an initial reference position voltage ($V_I$).

(5) A current D/A converter 16 converts the test slope digital word to a constant current for input to an integrating amplifier 26.

(6) The integrating amplifier 26 starts to integrate the constant current from the current D/A converter 16.

(7) The loadable counter 36 starts counting out a fixed time interval (T) as shown in FIG. 2 when the comparator 32 determines that the line slope voltage 29 output equals the initial reference position voltage 128 ($V_I$).

(8) The reference position register 10 is reloaded with a final reference position digital word for conversion to a final reference position voltage.

(9) The comparator 32 determines that the line slope voltage 29 equals the final reference position voltage 128 ($V_F$) and provides that indication to error detector 40.

(10) The error detector 40 provides a pulse to the feedback network 47 which begins when the final reference position voltage ($V_F$) is indicated by the comparator 32 and continues until the overflow of loadable counter 36. The specific count which was loaded into the loadable counter 36 is chosen to define a time which is longer than the worse case time for the line slope voltage 29 to transition between the initial position voltage ($V_I$) and the final position voltage ($V_F$). The error pulses are provided to the feedback network 47 for adjusting the electrically variable parameter 18 which controls the slope integrating amplifier 26 for achieving the exact line slope voltage 29 desired.

Figure 3:
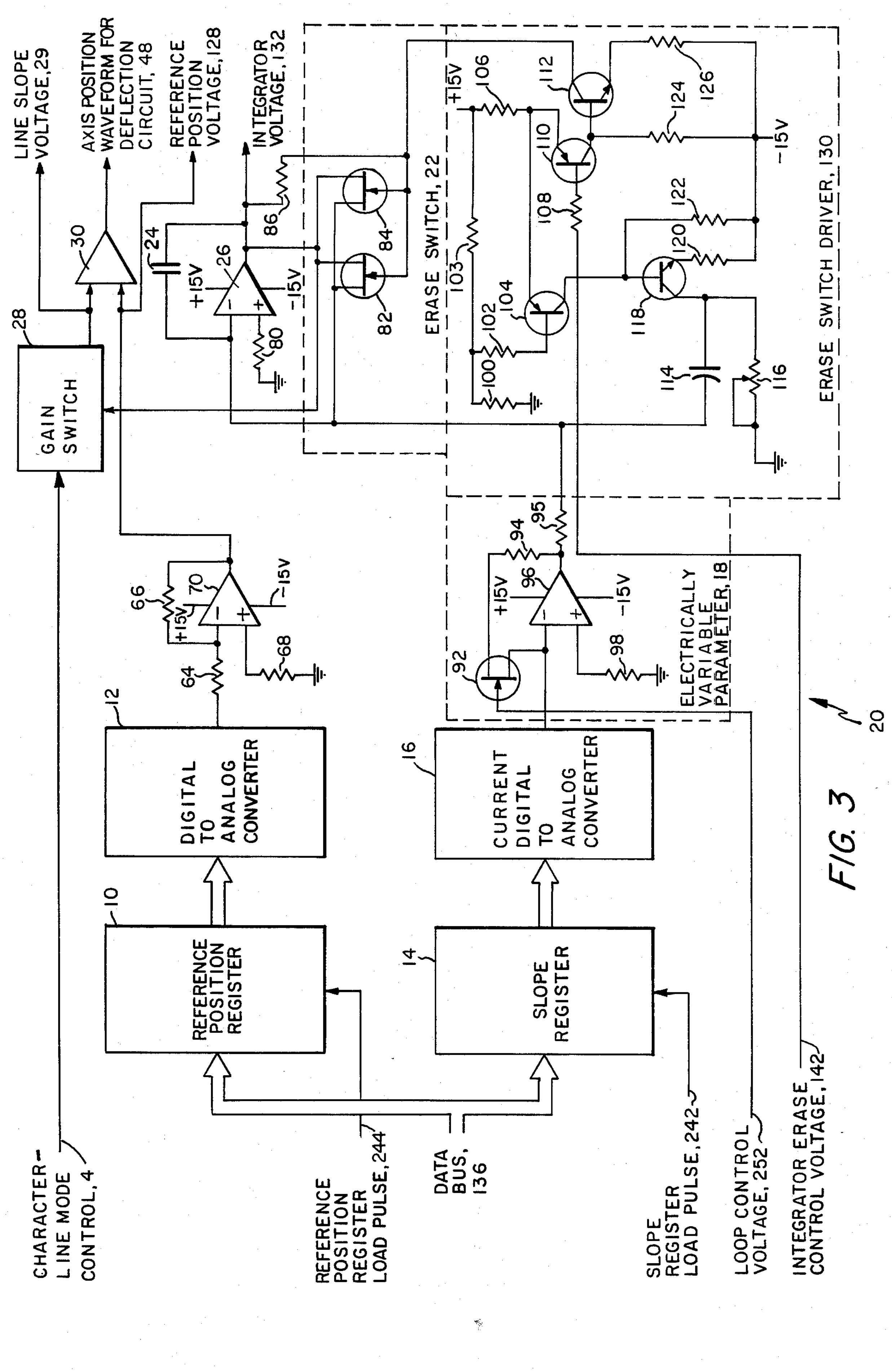
FIG. 3 shows the waveform generator 20 of FIG. 1 with a schematic representation of an electrically variable parameter 18, integrating amplifier 26, erase switch 22 and erase switch driver 130.

Referring now to FIG. 3, detail circuit designs for sections of the waveform generator 20 of FIG. 1 are shown for this invention. The reference position register 10 is loaded from data bus 136 by a reference position register load pulse 244. The slope register 14 is loaded from data bus 136 by a slope register load pulse 242. The electrically variable parameter 18 comprises an amplifier 96 with a field effect transistor (FET) 92 in its feedback path. The loop control voltage signal 252 from the feedback network 47 varies the dynamic resistance of FET 92 which in turn varies the current supplied to the integrating amplifier 26 by resistor 95. Capacitor 24 in the feedback path of integrating amplifier 26 produces the slope integration which generates an integrator voltage 132. The integrator voltage 132 is combined with the reference position voltage 128 in sum amplifier 30 to produce the axis position waveform for deflection circuit signal 48 for one axis of a display system; an identical line generator, as shown in FIG. 1, is used for the other axis of a display system. In order to insure that the output of integrating amplifier 26 is not altered prior to the start of integration, which would otherwise alter the summed voltage output defining position, an erase switch 22 is connected across the integrating amplifier 26. Said erase switch 22 comprises two FETs 82 and 84 which are operated in either a very low resistance state (turned-on) or a very high resistance state (turned-off) by the erase switch driver 130 which comprises bias stages 104 and 118, translator 110 and output switch 112.

Figure 4:
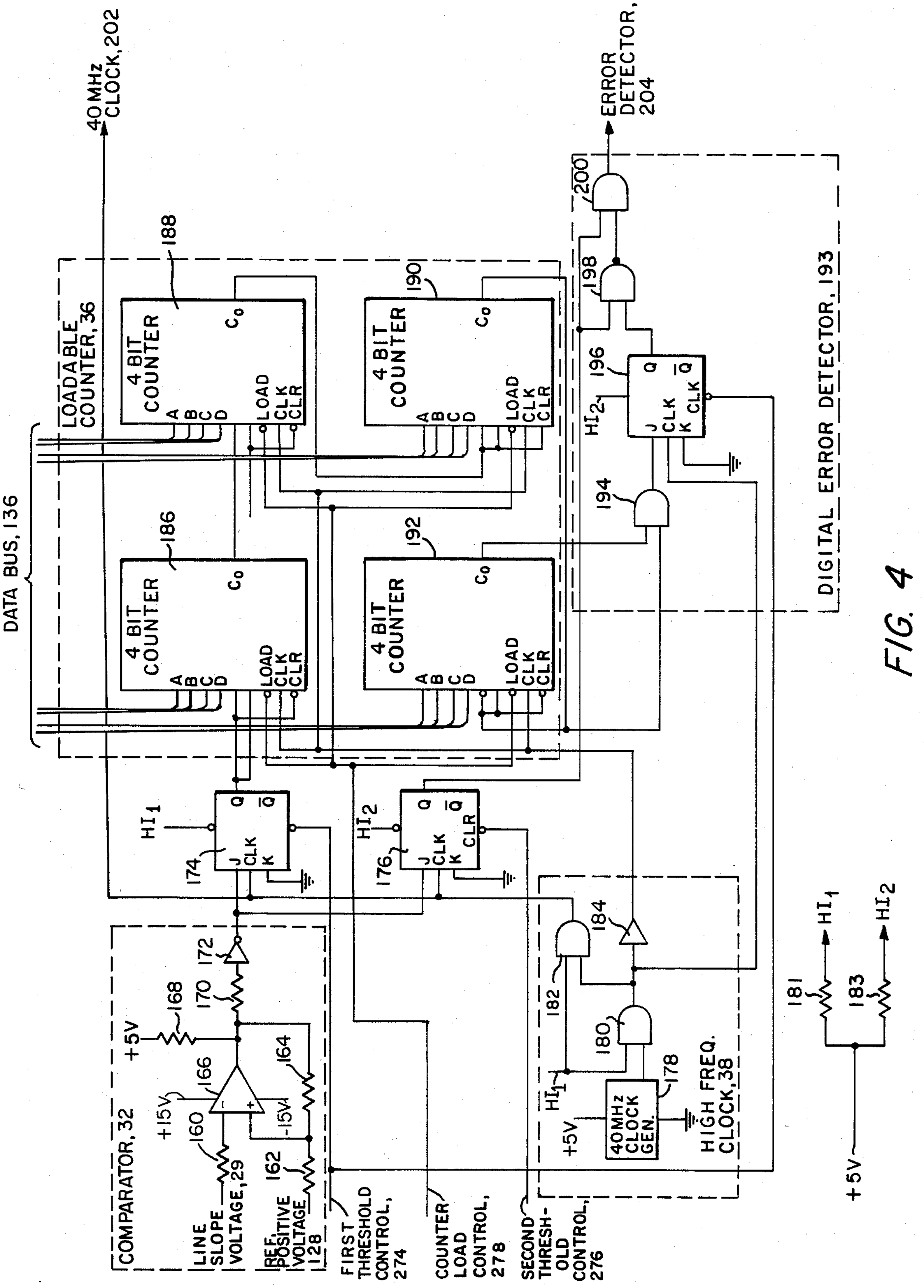
FIG. 4 is a schematic representation of a comparator 32, high frequency clock 38, loadable counter 36 and a digital error detector 193 portion of the error detector 40 depicted in FIG. 1.

Referring now to FIG. 4, the high frequency clock 38 comprises a 40 MHz clock generator 178 which provides internal timing for a precision time tracking line generator. The comparator 32 continuously senses the difference between line slope voltage 29 and the reference position voltage 128 and provides signals to the control logic 34 and the error detector 40 as shown in FIG. 1. The output of comparator 32 causes flip-flop 174 to trigger after the first threshold control signal 274 has released the flip-flop clear input and the line slope equals the initial reference position voltage ($V_I$), as shown in FIG. 2. The output of flip-flop 174 starts loadable counter 36 counting for a fixed time interval determined by the count initially loaded by counter load control signal 278 into said counter from a display processor via data bus 136. The loadable counter comprises four 4-bit counter devices 186, 188, 190 and 192. The length of the count time is set to be longer than the actual time for the line slope voltage 29 to reach the final reference position voltage ($V_F$) in order to always have a positive signal required from the output of error detector 40 with a variable pulse width indicating the amount of time error. The added count time is later removed within a loop filter 44 as shown in FIGS. 1 and 5.

The second threshold control signal 276 releases the clear input for flip-flop 176 which then waits for an output from comparator 32 to cause it to be set at the next 40 MHz clock pulse 202. The setting of flip-flop 176 causes the error detector 204 output signal to go to a high or positive level. The pulse width of the error detector signal 204 determines the amount of time error during a test operation. When the loadable counter 36 overflows, flip-flop 196 becomes set at the next clock pulse received from the high frequency clock 38 which causes the output to go high making the NAND gate 198 output switch to a low state thereby terminating the error detector 204 signal. The error detector signal 204 having a specific pulse width is processed by the feedback network 47 as shown in FIG. 5.

Figure 5:
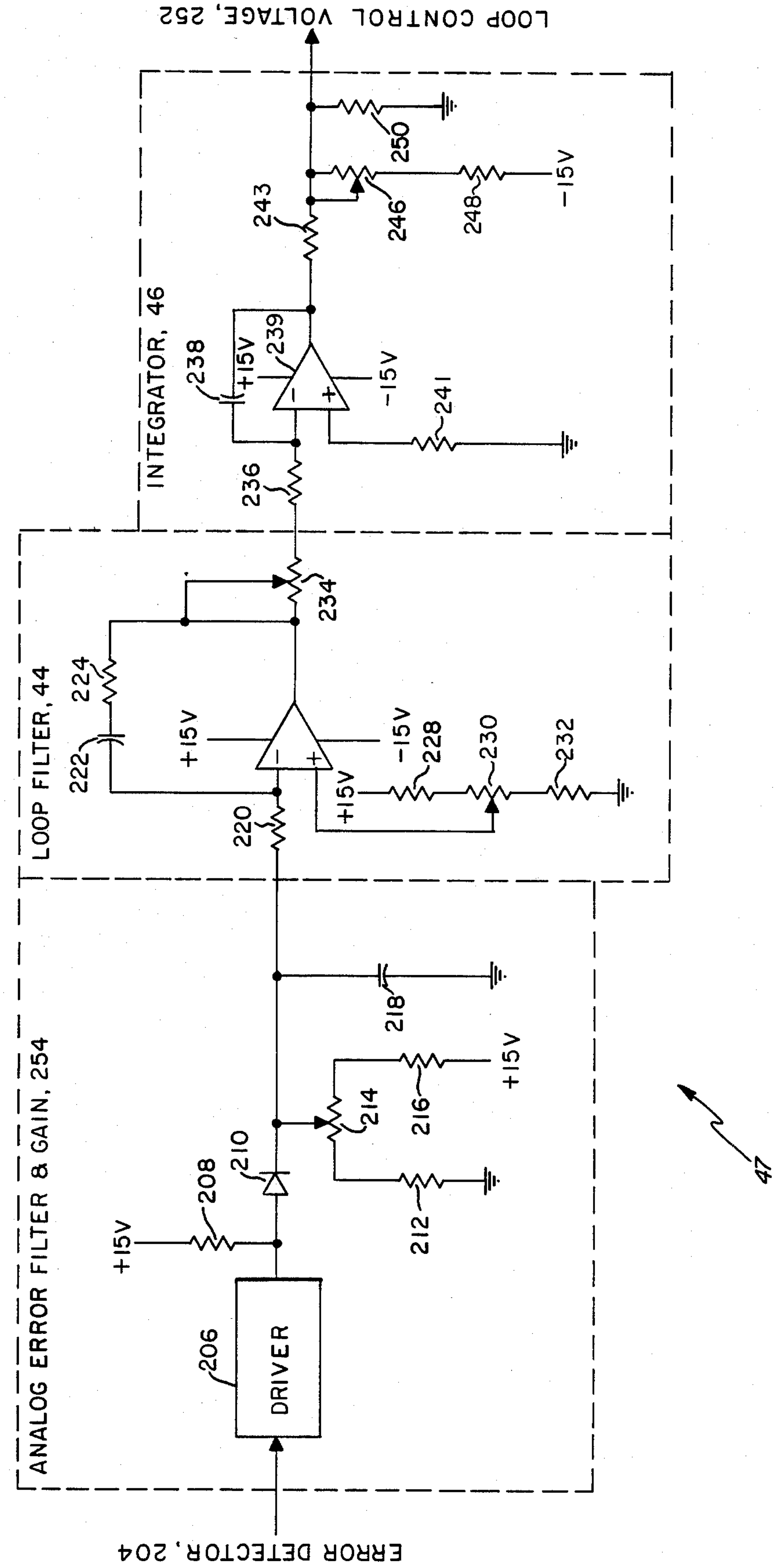
FIG. 5 is a schematic representation of a feedback network 47 of the invention comprising an analog error filter and gain circuit 254, a loop filter 44, and an integrator 46.

Referring now to FIG. 5, the circuits of the feedback network 47 in FIG. 1 are shown comprising an analog error filter and gain 254, a loop filter 44, and an integrator 46. The error detector signal 204 from the error detector 40 is the sole input into the feedback network.

Driver 206 functions as a switch providing either a ground or an open to the junction of resistor 208 and diode 210. When the error detector signal 204 is at a high voltage level, the driver provides an open circuit at said junction causing current to be fed from the +15 V supply through resistor 208 and diode 210 into capacitor 218. This current is typically in the range of 100 milliamps. During the absence of a high level on error detector signal 204 (which is the case the majority of the time), the driver 206 provides a ground to the junction of resistor 208 and diode 210 thereby causing diode 210 to be back-biased. The resulting discharge path consisting of resistors 212, 214 and 216 in parallel with resistor 220 provides a resistance several hundred times the value of resistor 208 and consequently allows leakage current of a small fraction of a milliamp to be supplied by capacitor 218. As a consequence, repeated error pulses cause the voltage across capacitor 218 to rise until the integrated charging current and discharging current are balanced. The resultant average voltage gain is approximately the ratio of said total discharge path resistance divided by the value of resistor 208.

The loop filter 44 provides a means for control of the transient characteristics of the feedback network 47. Capacitor 222 provides integration action which is limited in gain attenuation by resistor 224. The filter resulting from the combination of capacitor 222 and resistor 224 provides a trimming mechanism for the achievement of loop transient response and stability. Resistor 234 provides loop gain adjustability. Resistor 230 in combination with resistors 228 and 232 provide the necessary voltage injection to compensate for the deliberately introduced excessive delay in loadable counter 36, as shown in FIG. 4. The delay was introduced to insure that only a positive error would be produced by the digital error detector 193 thereby eliminating the need for a negative current driver in the analog error filter and gain circuitry 254. The resultant input voltage to the loop filter 44 consists of the voltage injection provided by resistor 230 minus the voltage produced by the analog error filter and gain 254. This resultant input is referred to as the net error.

The integrator 46 provides for accumulating an error output voltage. A long term shift in line generator parameters is compensated for by an accumulation of error signal at the integrator output during the loop transient response. Continued need for net error at the error detector input 204 is eliminated after the transient period. Thus, minimal error off-set results from long term parameter drift in a line generator. Resistor 246 provides for DC biasing to match the characteristic of the electrically variable parameter 18 shown in FIGS. 1 and 3. The loop control voltage signal 252 output of the integrator 46 provides the feedback control for varying the electrically variable parameter circuit 18 as shown in FIG. 3.

Figure 6:
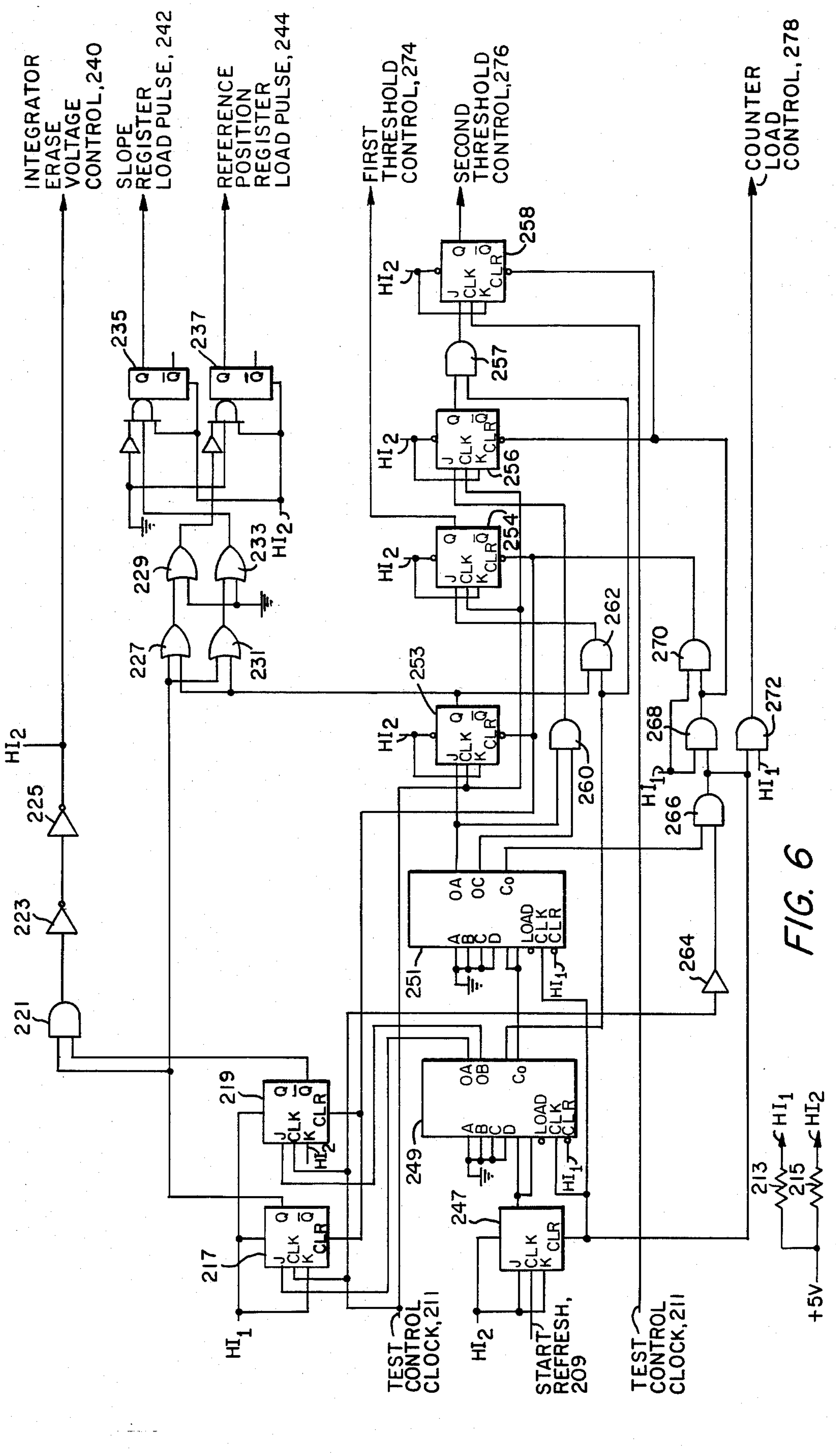
FIG. 6 is a logic diagram of the control logic 34 depicted in FIG. 1.

In addition to the high frequency clock 38 and some control logic shown in FIG. 4, the remainder of the control logic 34 is shown in FIG. 6. Since the test operations described hereinbefore occur during a display refresh interval, the start refresh signal 209 initiates the control logic operation along with a test control clock 211 which is generated by a display processor as a counted-down clock rate normally for the purpose of defining timing intervals at a rate significantly lower than 40 MHz. The test control clock 211 characteristics are determined by the integrator erase switch 22 and the reference position D/A converter 12 settling speed capability which in this preferred embodiment is approximately 1 MHz. The signals generated by the control logic 34 which have functionally been previously described comprise the integrator erase voltage control 240, slope resistor load pulse 242, reference position register load pulse 244, first threshold control 274 and the counter load control 278.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. In combination:

means for generating a reference position for a character or a line on a display;

means for generating a character slope or a line slope on said display for defining said character or said line;

said reference position generating means and said slope generating means producing a moving beam on said display for forming said character or said line; and means coupled to said slope generating means for testing and correcting said moving beam on said display by measuring a time for said beam to move from a specific initial position to a specific final position, said initial position and said final position being defined by said reference position generating means, and by adjusting a rate of charge of said position of said beam by varying an electrically variable parameter means in accordance with an output signal from an error detector means.

2. The combination as recited in claim 1 wherein:

signal outputs of said reference position generating means and said slope generating means couple to a sum amplifier means for producing said moving beam on said display.

3. The combination as recited in claim 1 wherein: said slope generating means comprises an integrating means.

4. The combination as recited in claim 3 wherein: said integrating means comprises said electrically variable parameter means for compensating for component variances.

5. The combination as recited in claim 4 wherein: said electrically variable parameter means comprises a variable resistance means.

6. The combination as recited in claim 4 wherein: said beam position testing and correcting means comprises a feedback means from the outputs of said reference position generating means and said slope generating means to said electrically variable parameter means.

7. The combination as recited in claim 6 wherein: said feedback means provides for adjustment of said electrically variable parameter means in said slope generating means.

8. The combination as recited in claim 1 wherein: said testing and correcting of said moving beam is performed during a refresh interval.

9. The combination as recited in claim 1 wherein: said output signal from said error detector means is generated by sensing the difference between a reference slope time and said measured time of said moving beam.

10. In combination:

means for generating a reference position for a character or a line on a display;

means for generating a character slope or a line slope on said display for defining said character or said line;

said reference position generating means and said slope generating means producing a moving beam on said display for forming said character or said line;

said slope generating means comprising a gain means for adjusting the size of said line or said character; and means coupled to said slope generating means for testing and correcting said moving beam on said display by measuring a time for said beam to move from a specific initial position and a specific final position, said initial position and said final position being defined by said reference position generating means, and by adjusting a rate of change of said position of said beam by varying an electrically variable parameter means in accordance with an output signal from an error detector means.

11. The combination as recited in claim 10 wherein: said slope generating means comprises an integrating means.

12. The combination as recited in claim 11 wherein: said integrating means comprises said electrically variable parameter means for compensating for component variances.

13. The combination as recited in claim 12 wherein: said beam position testing and correcting means comprises a feedback means from the outputs of said reference position generating means and said slope generating means to said electrically variable parameter means.

14. The combination as recited in claim 13 wherein: said feedback means provides for adjustment of said electrically variable parameter means in said slope generating means.

15. The combination as recited in claim 12 wherein: said electrically variable parameter means comprises a variable resistance means.

16. The combination as recited in claim 10 wherein: signal outputs of said reference position generating means and said slope generating means couple to a sum amplifier means for producing said moving beam on said display.

17. The combination as recited in claim 10 wherein: said testing and correcting of said moving beam is performed during a refresh interval.

18. The combination as recited in claim 10 wherein: said output signal from said error detector means is generated by sensing the difference between a reference slope time and said measured time of said moving beam.

19. In combination:

means for generating a reference position for a character or a line on a display;

means for generating a character slope or a line slope on said display for defining said character or said line;

said reference position generating means and said slope generating means producing a moving beam on said display for forming said character or said line;

said slope generating means comprising a gain means for adjusting the size of said line or said character;

comparator means for sensing a difference between said reference position and said slope of said beam being displayed over a defined interval of time;

control means responsive to the output of said comparative means for generating a fixed reference time during a testing and correcting of said moving beam on said display;

detector means coupled to said comparator means and said control means for determining an amount of time error resulting from said comparator means; and feedback means coupled to the output of said detector means for adjusting said slope generating means based on the amount of error determined by said detector means.

20. The combination as recited in claim 19 wherein: signal outputs of said reference position generating means and said slope generating means couple to a sum amplifier means producing said moving beam on said display.

21. The combination as recited in claim 19 wherein: said gain means is responsive to a character or line mode selection control signal.

22. The combination as recited in claim 19 wherein: an input of said detector means is coupled to a loadable counter means for determining said fixed period of time for said positional tests.

23. The combination as recited in claim 19 wherein: said feedback means comprises a gain circuit connected to the output of said detector means for amplifying a time error output signal.

24. The combination as recited in claim 23 wherein: said feedback means further comprises a loop filter connected to the output of said gain circuit for controlling the feedback loop transient characteristics.

25. The combination as recited in claim 24 wherein: said feedback means further comprises an integrator connected to the output of said loop filter for minimizing the amount of steady state error for very long time constant component value changes and providing a control signal to said slope generating means.

26. The combination as recited in claim 19 wherein: said slope generating means comprises an integrating means.

27. The combination as recited in claim 26 wherein: said integrating means comprises an electrically variable parameter means for compensating for component variances.

28. The combination as recited in claim 27 wherein: said electrically variable parameter means comprises a variable resistance means.

29. The combination as recited in claim 27 wherein: said electrically variable parameter means is controlled by said feedback means.

30. In combination:
a first register means for receiving reference position data to be converted to an analog representation;
a first digital-to-analog converter means for converting a digital word in said first register means to an analog signal representing a single axis reference position on a display;
a second register means for receiving character slope or line slope data to be converted to an analog representation;
a second ditital-to-analog converter means for converting a digital word in said second register means to an analog signal;
an electrically variable parameter means coupled to said second digital-to-analog converter for compensating for component variances due to temperature and aging;
an integrator means connected to the output of said electrically variable parameter means for producing a character or a line;
gain means for adjusting the size of said line or said character connected to the output of said integrator means and responsive to a character or line mode selection control signal;
an amplifier means for summing the outputs of said first digital-to-analog converter means and said integrator means to produce a moving beam on said display for forming said character or said line;
comparator means for comparing the outputs of said first digital-to-analog converter means and said integrator means to provide an error signal for beam position testing during a refresh interval;
control means responsive to the output of said comparator means for generating a fixed reference time during said testing and correcting of said moving beam on said display;
detector means for generating a feedback signal responsive to the output of said comparator means and said control means to perform correcting of said moving beam on said display; and
feedback means responsive to the output of said detector means for adjusting said electrically variable parameter means to accomplish said correcting.

31. The combination as recited in claim 30 wherein: said feedback means comprises a gain circuit connected to the output of said detector means for amplifying a time error output signal.

32. The combination as recited in claim 31 wherein: said feedback means further comprises a loop filter connected to the output of said gain circuit for controlling the feedback loop transient characteristics.

33. The combination as recited in claim 32 wherein: said feedback means further comprises an integrator connected to the output of said loop filter for minimizing the amount of steady state error for very long time constant component value charges and providing a control signal to said electrically variable parameter means.

34. The combination as recited in claim 30 wherein: said electrically variable parameter means comprises a variable resistance means.

35. The combination as recited in claim 30 wherein: said integrator means comprises an erase means for resetting said integrator means to a neutral output state.

36. The combination as recited in claim 30 wherein: said control means comprises a loadable counter responsive to an input data word presetting said counter to a specific count and responsive to a start signal from said control means.

37. The combination as recited in claim 30 wherein: said control means further comprises a high frequency clock.

38. The method of generating a precision time tracking line in a display system comprising the steps of:
generating a reference position for a character or a line on a display;
generating a character slope or a line slope on said display for forming said character or said line;
summing said reference position and said character slope or line slope in an amplifier for producing a moving beam on said display for forming said character or said line;
performing periodic positional tests on axial deflection waveform component signals for said display over a defined interval of time;
determining an amount of time error from said positional tests; and
adjusting said character slope or said line slope with feedback means based on the amount of said error.

39. The method as recited in claim 38 wherein: the step of generating a character slope or a line slope comprises integrating a constant current from an electrically variable parameter means.

40. The method as recited in claim 35 wherein: said step of integrating a constant current comprises a constant current generated by a variable resistance means.

41. The method as recited in claim 39 wherein: said step of integrating a constant current from an electrically variable parameter means is controlled by said feedback means.

42. The method as recited in claim 38 wherein: the step of performing periodic positional tests comprise moving a beam on said display over a defined interval of time with reference to a specific initial position and a specific final position.

43. The method of performing positional tests comprising the steps of:
loading an initial reference position digital word into a reference position register;
loading a specific test slope digital word into a slope register;
loading a specific count into a loadable counter means;
converting said initial reference position digital word into an initial reference position voltage;
converting said test slope digital word into a constant current;

integrating said constant current derived from said test slope digital word to obtain a line slope voltage;

counting-out a test time interval by initiating said counter means when said initial reference position voltage equals said line slope voltage;

loading a final reference position digital word into said reference position register for conversion to a final reference position voltage;

measuring an error signal as the difference between a time at which said line slope voltage equals the final position reference voltage and a time at which said test time interval has been counted-out; and adjusting said line slope voltage to the exact slope desired by providing a periodic measurement of said error signal to a feedback network.

44. The method as recited in claim 43 wherein:

the step of adjusting said line slope voltage comprises said feedback network providing a loop control voltage signal to an electrically variable resistance circuit.

* * * * *